3,193,456
3,5-DIMETHOXY-4-ALLYLOXY-BENZAMIDE COMPOSITIONS AND METHOD OF USE
Roland-Yves Mauvernay, Riom, France, assignor to Centre Europeen de Recherches Mauvernay, Chateau de Bardon, Riom, Puy-de-Dome, France
No Drawing. Filed Sept. 27, 1962, Ser. No. 227,654
Claims priority, application France, Apr. 16, 1962, 894,584, Patent 2,017; June 15, 1962, 900,947; July 18, 1962, 904,394
2 Claims. (Cl. 167—52)

The present invention relates to 4-allyloxy-benzamides, and more particularly to a new series of benzamides substituted in 4-position by an allyloxy or by a methallyloxy group, which compounds act on the central nervous system and are particularly effective as sedatives, sedatives with hypnotic effect and analgesics.

It is a primary object of the present invention to provide a new series of compounds, and more particularly for allyloxy and for methallyloxy benzamides, which compounds are active on the central nervous system.

It is yet another object of the present invention to provide a method of producing the new compounds of the invention.

It is still another object of the present invention to provide for the use of the new compounds of the present invention as sedatives, and for other purposes.

Other objects and advantages of the present invention will be apparent from a further reading of the specification and of the appended claims.

With the above and other objects in view, the present invention mainly comprises a compound of the formula:

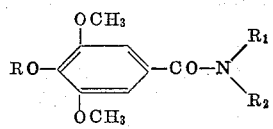

wherein R is selected from the group consisting of allyl and methallyl, and wherein $R_1$ and $R_2$ are each selected from the group consisting of hydrogen, alkyl, and cycloalkyl and together with the N-atom from the group consisting of 5- and 6-member saturated nitrogen-containing heterocyclic radicals.

The compounds of the present invention are produced in general by reacting a compound of the formula:

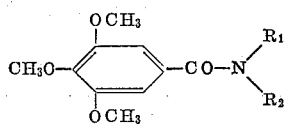

wherein $R_1$ and $R_2$ have the same definitions as above, with concentrated sulfuric acid so as to form the corresponding 4-hydroxy compound of the formula:

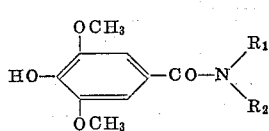

wherein $R_1$ and $R_2$ have the same definitions as above, and reacting said 4-hydroxy compound with a compound selected from the group consisting of allyl halides and methallyl halides so as to form the corresponding 4-allyl or 4-methallyl derivative of the first formula above, namely:

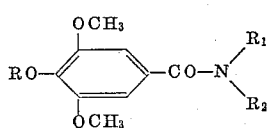

The method of the present invention is clearly illustrated by the following equations:

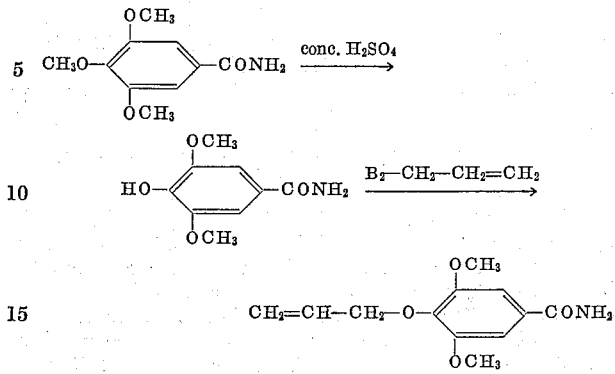

The action of the concentrated sulfuric acid on the 3,4,5-trimethoxy-benzamide in the first stage of the method is preferably carried out at a temperature of about 40–45° C.

In the second stage of the method the substituent "X" is a halide, and where R is allyl then the halide is preferably bromine, while when R is methallyl the halide is preferably chlorine. Thus, the second stage of the method when it is desired to produce a 4-allyloxy compound utilizes most preferably allyl bromide, whereas when it is desired to produce a 4-methallyloxy compound then methallyl chloride is most preferably used.

The following examples are given to further illustrate the method of the present invention. The scope of the invention is not, however, meant to be limited to the specific details of these examples.

EXAMPLE 1

*First stage: Production of 3,5-dimethoxy-4-hydroxy-benzamide*

200 g. of well dried 3,4,5-trimethoxy benzamide are added to 800 cc. of concentrated sulfuric acid. The mixture is placed in a bath thermostatically controlled at a temperature between about 40 and 45° C. After about 2 hours the dissolution of the product in the concentrated sulfuric acid is complete.

The reaction, under these conditions, is terminated in about 23 hours.

The solution is then poured slowly onto 2 kg. of crushed ice. It is allowed to stand for several hours, filtered, and washed with cold water. The precipitate is mixed with stirring with a solution of saturated sodium bicarbonate, filtered and washed with water. The product is recrystallized from the water.

The recrystallized product is in the form of white needles melting at 184–185° C. The product is entirely soluble in dilute solutions of sodium hydroxide or potassium hydroxide. The compound gives a green color with ferric chloride. The calculated nitrogen percentage is 7.11 and the percentage found is 7.08.

*Second stage: Production of 3,5-dimethoxy-4-allyloxy-benzamide*

197 g. (1 mol) of the product of the first stage (3,5-dimethoxy-4-hydroxy-benzamide), 500 cc. of methanol and 133 g. of allyl bromide (1.1 mols) are placed in a three-necked flask provided with a stirrer under the protection of a bromine funnel and a reflux condenser. The mixture is refluxed and there is then added drop by drop with good agitation 1 mol of potassium hydroxide dissolved in the minimum of water (the addition of the reactant requires about 75 minutes).

The reaction mixture is again heated to refluxing until neutrality of the medium (the whole requires about 2 hours).

After separation of the potassium bromide, the solution is concentrated to half its volume. There is then added an equal volume of water, and the whole is permitted to stand for several hours in an ice chamber.

After filtration, the product is washed with dilute sodium hydroxide then with water, and recrystallized from the mixture of methanol:water (1:1).

The crystals are white and melt at 157° C. The calculated amount of nitrogen is 5.90% and the amount found is 5.93%.

EXAMPLE 2

Preparation of 3,5-dimethoxy-4-allyloxy-N-diisopropyl-benzamide

*First stage.*—70 grams of 3,4,5-trimethoxy-N-diisopropyl-benzamide which are well dried are added to 280 cc. of concentrated sulfuric acid. The mixture is placed in a bath thermostatically controlled at a temperature of 40–45° C. The dissolution is completed in about 3 hours.

After 23 hours the solution is poured onto 900 g. of crushed ice. It is allowed to stand for several hours. The reaction mixture is then filtered, washed with water, and then with a saturated solution of sodium bicarbonate.

The product thus obtained is dissolved in a solution of dilute sodium hydroxide (2 normal) and reprecipitated by hydrogen chloride.

There is thus obtained white crystals which are very slightly soluble in water, soluble in alcohol and in dilute solutions of sodium hydroxide and of potassium hydroxide. The product gives a green color with ferric chloride. For analysis the product is recrystallized from methanol. The compound melts at 206 C. and the calculated percentage of nitrogen is 4.98 while the percentage found is 5.02.

*Second stage.*—The compound obtained in the first stage (3,5 - dimethoxy - 4 - hydroxy - N-diisopropyl-benzamide) is treated with allyl bromide under the same conditions as described in Example 1.

After the reaction is ended the solvent is evaporated under vacuum. The residue is taken up by water. There is thus obtained an oil which is extracted with ether.

The etherified solution is washed with dilute sodium hydroxide and then with water. After evaporation of the solvent there is obtained an oil which rapidly crystallizes. The product is recrystallized from a mixture of benzene-petroleum ether. The melting point is 73 C. The calculated amount of nitrogen is 4.36% and the amount found is 4.36%.

EXAMPLE 3

Preparation of 3,5-dimethoxy-4-allyloxy-N-n-butyl-benzamide

*First stage.*—100 g. of 3,4,5-trimethoxy-N - n - butyl-benzamide which are well dried are added to 400 cc. of concentrated sulfuric acid. The solution is maintained at a temperature of 40–45° C. for 23 hours.

The mixture is then poured onto 1 kg. of crushed ice. After crystallization the product is filtered, washed with water and then with a solution saturated with sodium bicarbonate. The product thus obtained is dissolved in a solution of dilute sodium hydroxide (2 normal) and reprecipitated by hydrogen chloride. The yield is 70%.

There is thus obtained a white crystalline powder. The product is very slightly soluble in water, soluble in dilute solutions of sodium hydroxide or a potassium hydroxide, and gives a green color with ferric chloride. It is recrystallized from methanol. The compound melts at 195–196° C. The calculated amount of nitrogen is 5.53% and the amount found is 5.52%.

*Second stage.*—The thus obtained 3,5-dimethoxy-4-hydroxy-N-n-butylbenzamide is reacted with allyl bromide under the same conditions as described in Example 1.

The product is recrystallized from a mixture of equal parts of methanol and water. There is thus obtained 3,5-dimethoxy-4-allyloxy-4-N - n - butylbenzamide in the form of white needles which are very slightly soluble in water, soluble in alcohol, acetone and ether. The compound is obtained in a yield of 77% and melts at 96° C. The calculated amount of nitrogen is 4.77% and the amount found is 2.76%.

EXAMPLE 4

Production of 3,5-dimethoxy-4-methallyloxy-N-n-butylbenzamide 3,5-dimethoxy-4-hydroxy-N-n - butylbenzamide is produced from 3,4,5-trimethoxy-N-n-butylbenzamide as described in Example 3.

A mixture of 25.3 g. (0.1 mol) of 3,5-dimethoxy-4-hydroxy-N-n-butylbenzamide, 120 cc. of ethanol and 10.8 g. (0.12 mol) of β-methallyl chloride are heated to refluxing in a water bath. While the mixture is refluxing there is added an equivalent of potassium hydroxide dissolved in 20 cc. of water. The reaction mixture is permitted to reflux for 5 to 6 hours.

The solvent is then evaporated under vacuum. The residue is taken up in cold water, filtered, washed with sodium hydroxide and then washed with water. The crude product is recrystallized from a mixture of methanol and water. There is thus obtained the product in the form of white crystals. The yield is 82%. The melting point is 89° C. The amount of nitrogen calculated is 4.56% and the amount found is 4.53%.

The following table illustrates several compounds falling within the scope of the present invention:

| Compound | R | $R_1$ | $R_2$ | Melting point, °C. | N, percent Calculated | N, percent Found |
|---|---|---|---|---|---|---|
| 3,5-dimethoxy-4-allyloxy-benzamide | $CH_2=CH—CH_2—$ | H | H | 157 | 5.90 | 5.93 |
| 3,5-dimethoxy-4-methallyloxybenzamide | $CH_2=C(CH_3)—CH_2—$ | H | H | 142 | 5.57 | 5.56 |
| 3,5-dimethoxy-4-allyloxy-N-methylbenzamide | $CH_2=CH—CH_2—$ | H | $CH_3$ | 119 | 5.57 | 5.60 |
| 3,5-dimethoxy-4-allyloxy-N-cyclohexyl-benzamide | $CH_2=CH—CH_2—$ | H | $C_6H_{11}$ | 140 | 4.38 | 4.39 |
| 3,5-dimethoxy-4-allyloxy-N-isopropyl-benzamide | $CH_2=CH—CH_2$ | H | $—CH(CH_3)_2$ | 121 | 5.01 | 5.05 |
| 3,5-dimethoxy-4-allyloxy-N-ethylbenzamide | $CH_2=CH—CH_2$ | H | $—C_2H_5$ | 89 | 5.28 | 5.30 |
| 3,5-dimethoxy-4-allyloxy-N-n-butylbenzamide | $CH_2=CH—CH_2$ | H | $n-C_4H_9$ | 96 | 4.77 | 4.76 |
| 3,5-dimethoxy-methallyloxy-N-n-butyl-benzamide | $CH_2=C(CH_3)—CH_2—$ | H | $n-C_4H_9$ | 89 | 4.56 | 4.53 |

| Compound | R | $R_1$ | $R_2$ | Melting point, °C. | N, percent Calculated | N, percent Found |
|---|---|---|---|---|---|---|
| 3,5-dimethoxy-4-methallyloxy-N-isopropylbenzamide. | $CH_2=C-CH_2-$ <br> \| <br> $CH_3$ | H | $-CH\begin{smallmatrix}CH_3\\CH_3\end{smallmatrix}$ | 134 | 4.77 | 4.78 |
| 3,5-dimethoxy-4-methallyloxy-N-n-propylbenzamide. | $CH_2=C-CH_2-$ <br> \| <br> $CH_3$ | H | $n-C_3H_7$ | 70 | 4.77 | 4.77 |
| 3,5-dimethoxy-4-allyloxy-N-n-propylbenzamide. | $CH_2=CH-CH_2$ | H | $n-C_3H_7$ | 72 | 5.01 | 5.03 |
| 3,5-dimethoxy-4-allyloxy-N-diisopropylbenzamide. | $CH_2=CH-CH_2$ | $-CH\begin{smallmatrix}CH_3\\CH_3\end{smallmatrix}$ | $-CH\begin{smallmatrix}CH_3\\CH_3\end{smallmatrix}$ | 73 | 4.36 | 4.36 |
| 3,5-dimethoxy-4-methallyloxy-N-diisopropylbenzamide. | $CH_2=C-CH_2$ <br> \| <br> $CH_3$ | $-CH\begin{smallmatrix}CH_3\\CH_3\end{smallmatrix}$ | $-CH\begin{smallmatrix}CH_3\\CH_3\end{smallmatrix}$ | 76 | 4.17 | 4.19 |
| 3,5-dimethoxy-4-allyloxy-(N-morpholino)-benzoic acid. | $CH_2=CH-CH_2-$ | $-N\bigcirc O$ | | 73 | 4.56 | 4.53 |

The compounds of the present invention are sedative hypnotics. These compounds potentiate the action of barbiturates, have a tranquilizing action, analeptic action and several of the compounds are also analgesics.

The activities of the compounds of the present invention are illustrated by tests carried out on 3,5-dimethoxy-4-allyloxy-benzamide.

The $LD_{50}$ of this compound, per os is 2466 mg./kg., with appearance of the first deaths at between 1000 and 1200 mg./kg. In comparison thereto, the $LD_{50}$ upon oral administration to mice of meprobamate is 1800 mg./kg., and of the product sold under the trademark "Librium" which is chlordiazepoxide hydrochloride or 7-chloro-2-methylamino-5-phenyl-3H-1,4-benzodiapine - 4-oxide hydrochloride is 750 mg./kg.

The sedative action of the compound upon pharmacodynamic tests shows the compound to have a hypnotic action, the ratio of the $LD_{50}$ to the $ED_{50}$ (the dose which causes 50% of the animals to sleep) being 3.3. Contrary thereto no hypnotic action can be obtained with librium except with toxic doses, and furthermore, the hypnotic and sedative action is greater than with meprobamate in the same doses.

In addition, the compound potentiates the action of barbiturates.

The compound also has an analeptic action as proved by its protective action against mortal doses of strychnine and by the Rotarod test. The compound also has an analgesic action.

When used as a sedative-hypnotic in the treatment of neurotic states, insomnia, anxieties, etc., the compound may be administered in the form of tablets or dragees containing 0.25 g. to 0.50 g. in an amount of 1 to 6 tablets or dragees per day. The compound may also be used in the form of suppositories, for infants and adults, containing 0.25 g. to 0.50° g. of active ingredient, administered 1 to 3 per day.

As indicated above, the compounds of the present invention potentiate the action of the normal barbiturates, particularly pentobarbital, secobarbital, amobarbital, cycloheptenylethylmalonylurea, and for this purpose may be administered in the form of dragees, tablets, suppositories, or the like. Suitable compositions comprise 100 parts of the compound of the present invention per each 5 to 50 parts of the barbiturate (by weight). Such compositions may be administered 1 to 6 per day.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The method of achieving a sedative action, which comprises administering to a patient requiring a sedative between 0.25 to 0.50 g. of 3,5-dimethoxy-4-allyloxy-benzamide.

2. A sedative composition consisting essentially of a barbiturate and 3,5 - dimethoxy - 4 - allyloxy - benzamide, wherein for 100 parts by weight of the latter compound said barbiturate is present in an amount between 5 to 50 parts.

References Cited by the Examiner

UNITED STATES PATENTS

| | | | |
|---|---|---|---|
| 2,694,088 | 11/54 | Sahyun | 260—559 |
| 2,870,145 | 1/59 | Perron | 260—247.2 |
| 2,895,992 | 7/59 | Ohnacker | 260—559 |
| 2,912,453 | 11/59 | Moffett | 260—559 |
| 2,993,831 | 7/61 | Shapiro et al. | 167—52 |
| 3,036,128 | 5/62 | Moffett | 260—559 |
| 3,044,931 | 7/62 | Holstius | 167—52 |

FRANK CACCIAPAGLIA, Jr., *Primary Examiner.*

DUVAL T. McCUTCHEN, *Examiner.*